United States Patent [19]

Campbell

[11] 4,447,190
[45] May 8, 1984

[54] FLUID PRESSURE CONTROL IN A GAS TURBINE ENGINE

[75] Inventor: David A. Campbell, Borrowash, England

[73] Assignee: Rolls-Royce Limited, London, England

[21] Appl. No.: 438,632

[22] Filed: Nov. 2, 1982

[30] Foreign Application Priority Data

Dec. 15, 1981 [GB] United Kingdom ............... 8137691

[51] Int. Cl.³ ............................................. F01D 11/06
[52] U.S. Cl. ..................................... 416/95; 415/115; 415/110; 415/116
[58] Field of Search ................ 416/95, 96, 97, 92, 416/90; 415/115, 116, 110, 94, 146, 175

[56] References Cited

U.S. PATENT DOCUMENTS

| 2,988,325 | 6/1961 | Dawson | 415/115 |
| 3,975,901 | 8/1976 | Hallinger et al. | 415/115 |
| 4,218,189 | 8/1980 | Pask | 416/95 |
| 4,265,590 | 5/1981 | Davis | 416/95 |
| 4,348,157 | 9/1982 | Campbell et al. | 415/115 |

FOREIGN PATENT DOCUMENTS

| 1043718 | 11/1958 | Fed. Rep. of Germany | 416/95 |
| 1168771 | 10/1969 | United Kingdom | 415/115 |
| 1381277 | 10/1969 | United Kingdom | 416/95 |

Primary Examiner—Stephen Marcus
Assistant Examiner—Kwon John
Attorney, Agent, or Firm—Cushman, Darby & Cushman

[57] ABSTRACT

Air is bled from the compressor of a gas turbine engine and it is led to holes in the shanks of turbine blades, so as to cool the interiors of the blades during operation of the engine. Some of the air leaks radially outwards, to seal the gas annulus against hot gas leaks onto the face of the turbine disc. A reduced flow of cooling air is enabled at conditions other than engine full throttle. This however, starves the gas sealing air. The invention provides a back up supply, by putting the air through a plenum chamber and dividing it so that when cooling airflow is reduced, a further sealing air flow is provided in compensation therefore.

7 Claims, 3 Drawing Figures

FLUID PRESSURE CONTROL IN A GAS TURBINE ENGINE

The present invention relates to the control of fluid pressure in a gas turbine engine, where that pressure is utilized to achieve a desired effect.

More specifically, the invention relates to a device for achieving of a substantially constant effect when the fluid pressure so utilized, is deliberately varied.

It is known, to duct compressed air from the compressor of a gas turbine engine to the roots of a stage of hollow turbine blades, for the purpose of cooling the blade interior and so allowing higher gas temperatures in the turbine.

It is also known, to use a portion of the same compressed air to counter the tendency of turbine gases to leak inwardly between blade and guide vane, by delivering the compressed air to the blade roots at such a pressure, that excess air which results is diverted from the root area, to leak through restricting seal members, to the gap between blades and guide vanes and so prevents the gas leak.

It is not desirable to maintain the same rate of flow of compressed air to the blade roots, over all of the power settings of the gas turbine engine. For example, on throttling the gas turbine engine, gas temperatures fall, thus reducing the need for blade cooling. If the compressed air flow is reduced however, it automatically reflects on the quantity of air available for sealing the gas annulus and gas leakage may and probably will occur.

The invention seeks to provide a gas turbine engine including an improved compressed air distributor.

Accordingly, the present invention comprises a gas turbine engine including fixed structure, a turbine stage comprising a disc and blades, a pair of annular lands adapted for co-rotation with said turbine stage, a pair of annular grooves in said fixed structure for receipt of said annular lands, a first annular space to which cooling air is passed from between said lands, a further annular space radially outwardly of said first annular space, a plenum chamber for receipt of pressurized air, a pair of ducts communicating with said plenum chamber and with respective annular spaces and valve means in each duct and adapted for simultaneous operation to reduce the flow of pressurized air in one duct and increase the flow of pressurized air in the other duct.

The invention will now be described, by way of example and with reference to the accompanying drawings om which:

Figure 1:
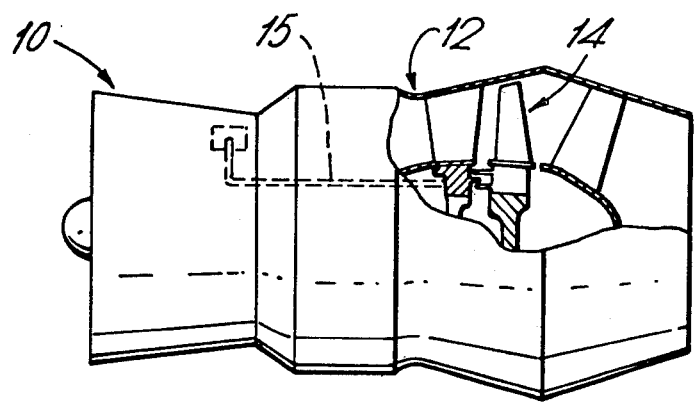
FIG. 1 is a diagrammatic view of a gas turbine engine incorportating an embodiment of the invention.

In FIG. 1 a gas turbine engine 10 has a stage of fixed inlet guide vanes 12 and, immediately downstream thereof, a rotary turbine stage 14.

A supply of compressed air is ducted via conduit 15, to fixed structure 52 radially inwardly of guide vanes 12, for reasons which are explained later in this specification.

Figure 2:
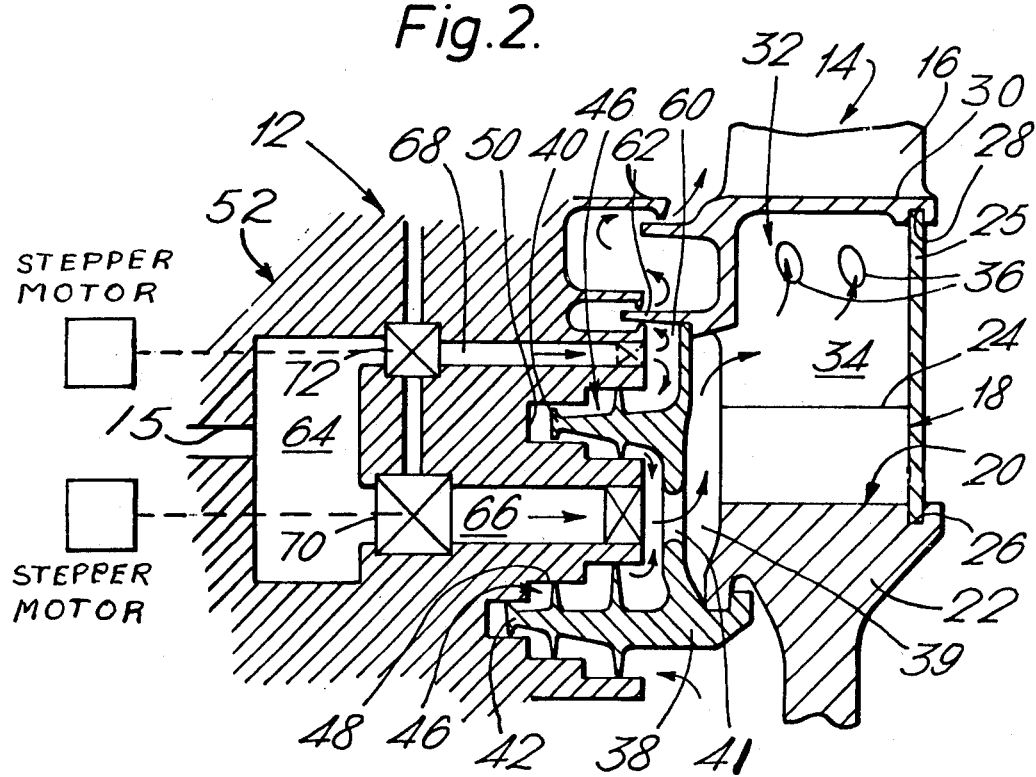
FIG. 2 is an enlarged, cross sectional part view of the gas turbine engine of FIG. 1.

Referring now to FIG. 2. Turbine stage 14 comprises a number of turbine blades 16 attached via their roots 18, to grooves 20 in the rim of turbine disc 22: Line 24 represents the maximum diameter of disc 22.

A blanking plate 25 is located in an annular groove 26 in disc 22 and in an annular grooves 28, made up from arcuate grooves in each platform 30 of each turbine blade 16.

Plate 25 locates blade 16 axially of disc 22 and seals the interfaces of blade roots 18 and grooves 20 against leakage of cooling air therethrough.

The shank 32 of each blade is hollowed out at each side thereof, to provide a space 34 between each pair of adjacent blades 16 into which cooling air is injected. The air then passes into passages 36 and through the interior of each blade, to exit at the outer end thereof (not shown).

An annular plate 38 is fixed to the upstream face of disc 22 for rotation therewith. The plate 38 and disc 22 are co-shaped so as to provide an annular space 39 therebetween.

A number of holes 41 are provided in plate 38, for reasons which again, will be explained later in this specification.

A pair of lands 42, 40 protrude from the upstream face of plate 38 and each land 42, 40 has radial fins 46 thereon.

Lands 42, 40 project into respective, cooperating grooves 48, 50 in the fixed structure 52 which itself supports vanes 12. The spacing of fins 46 from the walls of their respective grooves 48, 50 is such that lands 42, 40 may just freely rotate in grooves 48, 50, when disc 22 and plate 38 are rotated by gas loads on turbine blades 16.

The radially outer portion of plate 38 cooperates with fixed structure 52, to provide a further annular space 60, which is all but closed by a fin 62 protruding from turbine blade shank 34.

Fixed structure 52 includes a plenum chamber 64 and a pair of ducts 66, 68. Ducts 66 communicates with plenum chamber 64 and annular space 39 via holes 41.

Duct 68 communicates with plenum chamber 64 and further annular space 60.

A valve 70 is arranged in duct 66 so as to control the flow of compressed air therethrough, from plenum chamber 64. Another valve 72 is arranged in duct 68 so as to achieve a similar effect. Valves 70, 72 are connected for simultaneous operation, such that as one valve moves to allow an increase in flow of pressurized air through its respective duct, the other valve simultaneously moves to reduce the flow of compressed air through its respective duct and vice versa.

Valves 70 and 72 are shown only in diagrammatic form. They could comprise spool valves rigidly connected, which would ensure the desired sumultaneous movement. Moreover, movement of the valves could be achieved by any suitable known mechanism. Alternatively, Valves 70 and 72 could comprise butterfly valves, again rigidly connected for simultaneous movement by any suitable known means. The valves and valve moving means per se are not regarded as being inventive.

Some of the pressurized air that exits from duct 66, passes through holes 40, into the space formed by the hollowed out shanks 34 of blades 16. From there and as already described, the air enters inlets 36 and passes up the interior of each blade 16 and is expelled from the outer end thereof (not shown).

The remainder of the air, which is at a higher pressure than the static pressure of the hot gases passing over vanes 12 and blades 16, leaks radially outwardly on a serpentine path, round land 40, through further space 60, round fin 62, to the gas annulus. Hot gases are thus prevented from leaking radially inwardly onto the blade shanks 34.

Maximum air flow is required for the purpose of cooling turbine blades 16, when for example an aircraft which gas turbine engine 10 in operation will propel, takes off. At such times the gas turbine engine is operated at full throttle and therefore the turbine entry temperature is at its highest. In such circumferences, valve 70 will be fully open and valve 72 will be fully shut. When however, a flight regime is adopted which requires the engine to be operated at less than full throttle e.g. cruise, turbine gas entry temperature drops, thus reducing the need for cooling air. The requirement for turbine annulus sealing air remains, however, no matter what engine throttle setting is adopted. The two valves 70 and 72 are thus interconnected, so that as valve 70 closes to reduce the airflow through it, valve 72 opens so as to provide an air flow to further space 60.

The interconnection of valves 70 and 72 may be achieved by any known means. For example, they may be rigidly connected by a rod (not shown) in the manner of a spool valve. Alternatively the valves 70, 72 may comprise butterfly valves interconnected by links (not shown). A further alternative comprises connecting valves 70 and 72 electrically i.e. make them solenoid operated, the solenoids (not shown) being arranged for simultaneous actuation to move the, or their respective valves at appropriate rates, so as to achieve the desired air flows.

A further alternative would be to move valves 70, 72 by stepper motors diagrammatically shown in FIG. 2, which would be arranged to rotate at rates which would ensure movement of valves 70, 72 at appropriate relative rates.

Figure 3:
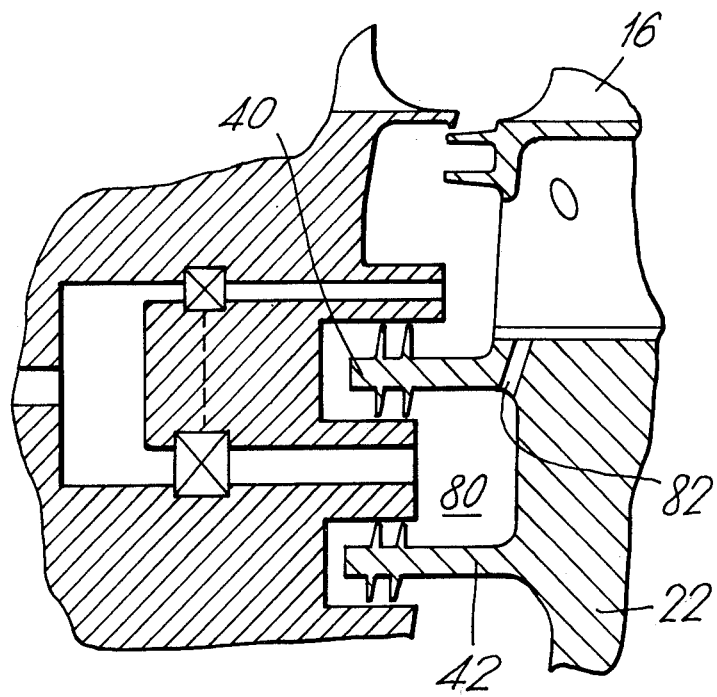
FIG. 3 is an alternative embodiment of the invention.

Referring now to FIG. 3. Annular plate 38 is obviated and lands 40, 42 are formed in the front face of turbine disc 22. Air from annular space 80, which corresponds to annular space 39 in FIG. 2, is passed therefrom, via holes 82 in disc 22, to a place adjacent the inner ends of turbine blades 16, which has inlets (not shown) to the passages in the blades.

I claim:

1. A gas turbine engine including a casing, a turbine stage comprising a disc having an upstream face and a rim and blades having shanks, a pair of annular lands adapted for co-rotation with said turbine stage, a pair of annular grooves in said casing for receipt of said annular lands, a first annular space to which cooling air is passed from between said lands, a further annular space radially outwardly of said first annular space, a plenum chamber for receipt of pressurized air, a pair of ducts communicating with said plenum chamber and with respective annular spaces and valve means in each duct and adapted for simultaneous operation to reduce flow of pressurized air in one duct and increase flow of pressurized air in the other duct.

2. A gas turbine engine as claimed in claim 1 wherein said lands are adapted for rotation by forming them integrally with upstream face of disc.

3. A gas turbine engine as claimed in claim 1 wherein said lands are adapted for rotation by forming them on an annular plate which is affixed to said upstream face of said disc so as to overlap said rim of said disc and said shanks of said blades and form with said upstream face of said disc said first annular space.

4. A gas turbine engine as claimed in claim 1 wherein said valve means comprises a spool valve.

5. A gas turbine engine as claimed in claim 1 wherein said valve means comprises linked butterfly valves.

6. A gas turbine engine as claimed in claim 1 wherein said valve means comprises blocking means in each duct, a stepper motor connected to each blocking means such that actuating thereof will move said blocking means in directions which will simultaneously block one duct and unblock said other duct.

7. A gas turbine engine as claimed in claim 1 or claim 6 wherein said plenum chamber is in said casing.

* * * * *